(12) United States Patent
Brugger et al.

(10) Patent No.: US 11,053,826 B2
(45) Date of Patent: Jul. 6, 2021

(54) EXHAUST GAS SYSTEM

(71) Applicant: CPT Group GMBH, Hannover (DE)

(72) Inventors: Marc Brugger, Neunkirchen-Seelscheid (DE); Carsten Kruse, Troisdorf (DE); Frank Bohne, Sülzetal (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/579,151

(22) Filed: Sep. 23, 2019

(65) Prior Publication Data

US 2020/0018207 A1    Jan. 16, 2020

Related U.S. Application Data

(63) Continuation of application No. PCT/EP2018/056697, filed on Mar. 16, 2018.

(30) Foreign Application Priority Data

Mar. 27, 2017   (DE) ..................... 10 2017 205 159.0

(51) Int. Cl.
F01N 3/20 (2006.01)
B01D 53/90 (2006.01)

(52) U.S. Cl.
CPC ............ F01N 3/2006 (2013.01); B01D 53/90 (2013.01); F01N 2240/20 (2013.01);
(Continued)

(58) Field of Classification Search
CPC combination set(s) only.
See application file for complete search history.

(56) References Cited

U.S. PATENT DOCUMENTS 6,620,391 B2 * 9/2003 Muller ............... B01D 53/8631
                                                      423/210
7,104,358 B2 * 9/2006 Frederiksen ............. F01N 1/04
                                                       181/211

(Continued)

FOREIGN PATENT DOCUMENTS

CN        101065561 A     10/2007
CN        103069119 A      4/2013
(Continued)

OTHER PUBLICATIONS

International Search Report and Written Opinion dated May 9, 2018 from corresponding International Patent Application No. PCT/EP2018/056697.

(Continued)

*Primary Examiner* — Binh Q Tran

(57) ABSTRACT

An exhaust system for the aftertreatment of exhaust gases of an internal combustion engine, having an annular catalytic converter which is flowed through by exhaust gas, wherein the annular catalytic converter has an inflow point and an outflow point and the annular catalytic converter has a tubular first flow path and an annular second flow path which are oriented concentrically with respect to one another and which are flowed through in series, wherein the first flow path is surrounded to the outside in a radial direction by the second flow path, wherein a pipe is led in the radial direction from the outside through the second flow path, wherein the pipe opens into the annular catalytic converter and the pipe has a radial extent at least as far as into the inner first flow path.

16 Claims, 2 Drawing Sheets

(52) U.S. Cl.
CPC ...... *F01N 2470/24* (2013.01); *F01N 2490/06* (2013.01); *F01N 2610/02* (2013.01); *F01N 2610/102* (2013.01); *F01N 2610/1453* (2013.01)

(56) References Cited

U.S. PATENT DOCUMENTS

| | | | |
|---|---|---|---|
| 8,015,802 B2 | 9/2011 | Nishiyama et al. | |
| 8,689,547 B2 * | 4/2014 | Burgers | F01N 3/2889 60/298 |
| 8,765,084 B2 * | 7/2014 | Hansen | F01N 3/2889 423/210 |
| 8,978,366 B2 | 3/2015 | Brugger | |
| 9,322,309 B2 * | 4/2016 | Beyer | F01N 3/00 |
| 9,371,764 B2 * | 6/2016 | Moran | F01N 3/2803 |
| 10,428,711 B2 * | 10/2019 | Zhang | B01F 5/0614 |
| 2006/0008397 A1 * | 1/2006 | Bruck | F01N 3/2821 422/180 |
| 2008/0264048 A1 * | 10/2008 | Nishiyama | B01D 53/944 60/299 |
| 2010/0263352 A1 | 10/2010 | Hylands et al. | |
| 2013/0152557 A1 * | 6/2013 | Brugger | F01N 3/2889 60/295 |

FOREIGN PATENT DOCUMENTS

| | | |
|---|---|---|
| DE | 102010034705 A1 | 2/2012 |
| DE | 102012006365 A1 | 10/2012 |
| EP | 2873821 A1 | 5/2015 |
| EP | 2960454 A1 | 12/2015 |
| EP | 3141719 A1 | 3/2017 |
| GB | 2454276 A | 5/2009 |
| JP | 2013540927 A | 11/2013 |
| JP | 2016-050522 A | 4/2016 |
| WO | 2011106487 A1 | 9/2011 |
| WO | 2013004917 A1 | 1/2013 |

OTHER PUBLICATIONS

German Office Action dated Jan. 25, 2018 for corresponding German Patent Application No. 10 2017 205 159.0.

* cited by examiner

EXHAUST GAS SYSTEM

CROSS-REFERENCE TO RELATED APPLICATIONS

This application claims the benefit of PCT Application PCT/EP2018/056697, filed Mar. 16, 2018, which claims priority to German Patent Application 10 2017 205 159.0, filed Mar. 27, 2017. The disclosures of the above applications are incorporated herein by reference.

FIELD OF THE INVENTION

The invention relates to an exhaust system for the aftertreatment of exhaust gases of an internal combustion engine, having an annular catalytic converter which is flowed through by exhaust gas, wherein the annular catalytic converter has an inflow point and an outflow point and the annular catalytic converter has a tubular first flow path and an annular second flow path which are oriented concentrically with respect to one another and which are flowed through in series, wherein the first flow path is surrounded to the outside in a radial direction by the second flow path.

BACKGROUND OF THE INVENTION

In exhaust-gas aftertreatment systems, new technologies are used in order to comply with the legally predefined limits for pollutant emissions and in particular with regard to nitrogen oxides. These include for example the injection of an aqueous urea solution (trade name: AdBlue) for the chemical reduction of nitrogen oxides. The aqueous urea solution has for example a fraction of approximately 33% pure urea, which is dissolved in approximately 67% demineralized water. The thermolysis and hydrolysis of the aqueous urea solution produces ammonia, which reacts with the nitrogen oxides in the exhaust gas and converts them into nitrogen and water vapor.

In order to release the ammonia bound in the aqueous urea solution, the solution must be evaporated. For this purpose, a sufficiently high system temperature is required and, furthermore, a sufficiently long flow path for the mixing of the aqueous urea solution or of the already evaporated ammonia with the flowing exhaust gas.

A disadvantage in the exhaust-gas aftertreatment systems known from the prior art is that the evaporation path and the mixing path are not optimally designed, whereby there is a delay in the activation of the exhaust-gas aftertreatment or until a certain reaction rate is attained, especially in the presence of low exhaust-gas temperatures. This is owing in particular to the fact that the metered addition of the aqueous urea solution takes place only above a minimum temperature in order to ensure that the liquid urea solution is evaporated quickly and is not entrained while still in liquid form by the exhaust-gas flow and does not ultimately settle in the exhaust system or escape into the environment.

SUMMARY OF THE INVENTION

It is therefore an object of the present invention to provide an exhaust system which permits particularly rapid heating and thus permits particularly early metered addition, whereby metered addition of the aqueous urea solution is made possible already shortly after the starting of the upstream internal combustion engine.

The object is achieved, with regard to the exhaust system, by means of an exhaust system.

One exemplary embodiment of the invention relates to an exhaust system for the aftertreatment of exhaust gases of an internal combustion engine, having an annular catalytic converter which is flowed through by exhaust gas, wherein the annular catalytic converter has an inflow point and an outflow point and the annular catalytic converter has a tubular first flow path and an annular second flow path which are oriented concentrically with respect to one another and which are flowed through in series, wherein the first flow path is surrounded to the outside in a radial direction by the second flow path, wherein a pipe is led in the radial direction from the outside through the second flow path, wherein the pipe opens into the annular catalytic converter and the pipe has a radial extent at least as far as into the inner first flow path.

An annular catalytic converter is particularly advantageous for particularly close-coupled installation, because it has a small installation space requirement and at the same time permits rapid and effective heating. By means of the two annular flow channels, a flow path is realized which is substantially doubled in length in relation to a conventional catalytic converter without diversion of the exhaust gas.

It is preferable for the radially inner flow path to be connected to the inflow point, such that the exhaust gas may flow into the annular catalytic converter via the first flow path. After flowing axially through the first flow path, the exhaust gas is diverted through 180° and flows into the second annular flow path, which surrounds the first flow path radially at the outside. After flowing through the second flow path in an axial direction opposite to the flow direction in the first flow path, the exhaust gas flows in a radial direction out of the annual catalytic converter or into a channel which ultimately conducts the exhaust gas out of the annular catalytic converter. In the flow paths, there may be arranged filter bodies or further catalytic converters which filter and chemically convert the flowing exhaust gas in order to minimize the discharge of emissions.

The pipe leads through a wall, which delimits the second flow path to the outside, into the interior of the annular catalytic converter. Here, the pipe projects in the radial direction at least through the second flow path into the first flow path, which is situated in the center in the radial direction. The aqueous urea solution is metered into the pipe by means of an injector. The aqueous urea solution subsequently propagates in the pipe and flow to the open end of the pipe into the annular catalytic converter.

The pipe is heated by the exhaust gas flowing around the pipe, whereby the thermolysis and the hydrolysis are promoted. The evaporation of the aqueous urea solution is particularly advantageous in particular at the points where the aqueous urea solution comes into direct contact with the wall of the pipe. This evaporation path is varied by means of a variation of the radial extent of the pipe.

The evaporated aqueous urea solution finally exits at that side of the pipe which is situated opposite the injector, and flows over into the exhaust-gas flow. Depending on how far the pipe extends into the annular catalytic converter, the evaporated urea solution flows over into the first flow path or the second flow path, where the evaporated urea solution mixes with the exhaust gas and triggers the reaction of the nitrogen oxides entrained in the exhaust gas to form nitrogen and water.

It is particularly advantageous if the exhaust gas, at a first axial end region of the annular catalytic converter, is caused to flow into the radially inner, first flow path through the inflow point and is caused to flow into the radially outer, second flow path by means of a flow diversion at the second axial end region, situated opposite the inflow point, of the annular catalytic converter, in which radially outer, second flow path the exhaust gas is caused to flow back to the first axial end region counter to the flow direction in the radially inner, first flow path, and wherein the exhaust gas, at the first axial end region, is caused to flow into a channel which leads to an outflow point.

The first and the second flow path each extend in the axial direction of the annular catalytic converter. The first, radially inner flow path is formed by a pipe. The second, radially outer flow path is annular and surrounds the first, radially inner flow path at least over large extents. At that axial end region of the first flow path which is situated opposite the inflow point, there is arranged a cover-like structure which serves for diverting the exhaust-gas flow into the second, radially outer flow path.

At that axial end region which also has the inflow point, an outflow point is arranged in a radial direction on an outer wall of the annular catalytic converter, through which outflow point the exhaust gas may flow out of the annular catalytic converter. In one advantageous embodiment, the outflow may also be realized by virtue of the exhaust gas being transferred in a radial direction from the second flow path into a channel which runs in the axial direction and which extends entirely or partially parallel to the first and/or second flow path and leads to an alternative outflow point.

It is also advantageous if the aqueous urea solution is metered into the pipe in the radial direction. The metering into the pipe along a radial direction, along which the pipe itself also extends, is advantageous in order to provide the largest possible contact area for the aqueous urea solution and at the same time achieve the most optimum possible propagation of the aqueous urea solution within the pipe. The greater the extent to which the aqueous urea solution comes into contact with the pipe wall heated by the exhaust gas, and the more finely the aqueous urea solution is distributed in the pipe, the more easily the thermolysis and the hydrolysis of the aqueous urea solution may take place.

A preferred exemplary embodiment is characterized in that the pipe has a radial extent through the radially inner, first flow path into the radially outer, second flow path. This is advantageous in order for as long as possible a section of the pipe to be flowed around by the exhaust gas from the first flow path and the exhaust gas from the second flow path, in order to thus keep the temperature in the pipe as high as possible and quickly permit complete evaporation.

It is also preferable if the pipe has a conically tapering cross section. This is advantageous in order to concentrate the flow of the aqueous urea solution or of the evaporated urea solution and to deliver it into the annular catalytic converter in as targeted a manner as possible.

It is furthermore advantageous if the pipe is arranged at that axial end region of the annular catalytic converter at which the exhaust gas is caused to flow into the annular catalytic converter through the inflow point. This is advantageous in order to bring the pipe into contact with the exhaust gas as early as possible and thus exploit the highest possible temperature of the exhaust gas. With the increase in the length of the flow path from the internal combustion engine to the annular catalytic converter, the temperature of the exhaust gas at the annular catalytic converter steadily decreases if no further means for heating are provided. Since a certain minimum temperature is necessary in order to be able to carry out the evaporation of the aqueous urea solution, it is advantageous if the available heat is utilized optimally. It is therefore advantageous if the metered introduction of the aqueous urea solution takes place as close as possible to the internal combustion engine. The sooner the minimum temperature for the evaporation of the aqueous urea solution is attained, the sooner the metered addition of the urea solution is commenced, only as a result of which the reduction of the nitrogen oxides is achieved in a particularly effective manner. Basically, the position of the metered addition with respect to the exhaust-gas temperature is less important than the position of the evaporation element for the evaporation of the aqueous urea solution. Primarily, it is the intention for the evaporation element, which in one embodiment according to the invention is formed by the pipe, to be rapidly heated.

It is furthermore advantageous if the pipe has surface-enlarging elements on its inner shell surface and/or on its outer shell surface.

This is advantageous in order to produce as large a surface as possible via which heat is transferred between the wall of the pipe and the aqueous urea solution. For example, it is particularly advantageous to provide elevations and depressions, fins, or other guide elements which positively influence the flow of the aqueous urea solution and at the same time enlarge the surface.

These elements for enlarging the surface may be provided both on the inner side and on the outer side of the pipe in order to generate the most effective possible heat transfer.

It is also expedient if the pipe is of structured form and/or is coated on its inner shell surface and/or on its outer shell surface. In particular, microstructures such as grooves or channels may be advantageously used to enlarge the surface in order to improve the heat transfer. Also advantageous are structures which, for example, help to generate a turbulent flow of the exhaust gas on the outside and of the aqueous urea solution on the inside, whereby a larger amount of heat may also be transferred.

Furthermore, the outer side and/or the inner side of the pipe may be lined with a coating. Here, it is for example possible for ceramic or metallic coatings to be provided, which likewise improve the heat transfer. These layers may be applied to the surfaces of the pipe for example with the aid of known methods.

It is furthermore advantageous if, by means of the pipe, a third flow path is formed which is flowed around by the exhaust gas in the first flow path and in the second flow path. This is advantageous in order to create a separate flow path for the aqueous urea solution which is as long as possible in order to permit sufficient evaporation of the aqueous urea solution by means of the complete execution of the thermolysis and the hydrolysis. Only the advantageously completely evaporated urea solution then exits the third flow path into one of the other flow paths of the annular catalytic converter.

It is furthermore expedient if a hydrolysis catalytic converter is integrated into the pipe. A hydrolysis catalytic converter is particularly advantageous in order to accelerate the second part of the evaporation, the hydrolysis, and thus more quickly achieve the complete evaporation of the urea solution. This consequently also promotes the reaction of the nitrogen oxides in the exhaust-gas flow, whereby the emissions in the exhaust gas is considerably reduced.

It is also advantageous if an exhaust-gas turbocharger is connected upstream of the inflow point, wherein the exhaust gas flowing out of the exhaust-gas turbocharger is caused to flow through the inflow point into the annular catalytic converter. Rapid heating of the pipe, and thus very rapid evaporation of the urea solution, is achieved in particular in the case of a very close-coupled arrangement of the annular catalytic converter. An arrangement of the annular catalytic converter directly downstream of the exhaust-gas turbocharger is therefore advantageous.

Advantageous developments of the present invention are described in the following description of the figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be explained in detail in the following text on the basis of exemplary embodiments with reference to the drawings, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
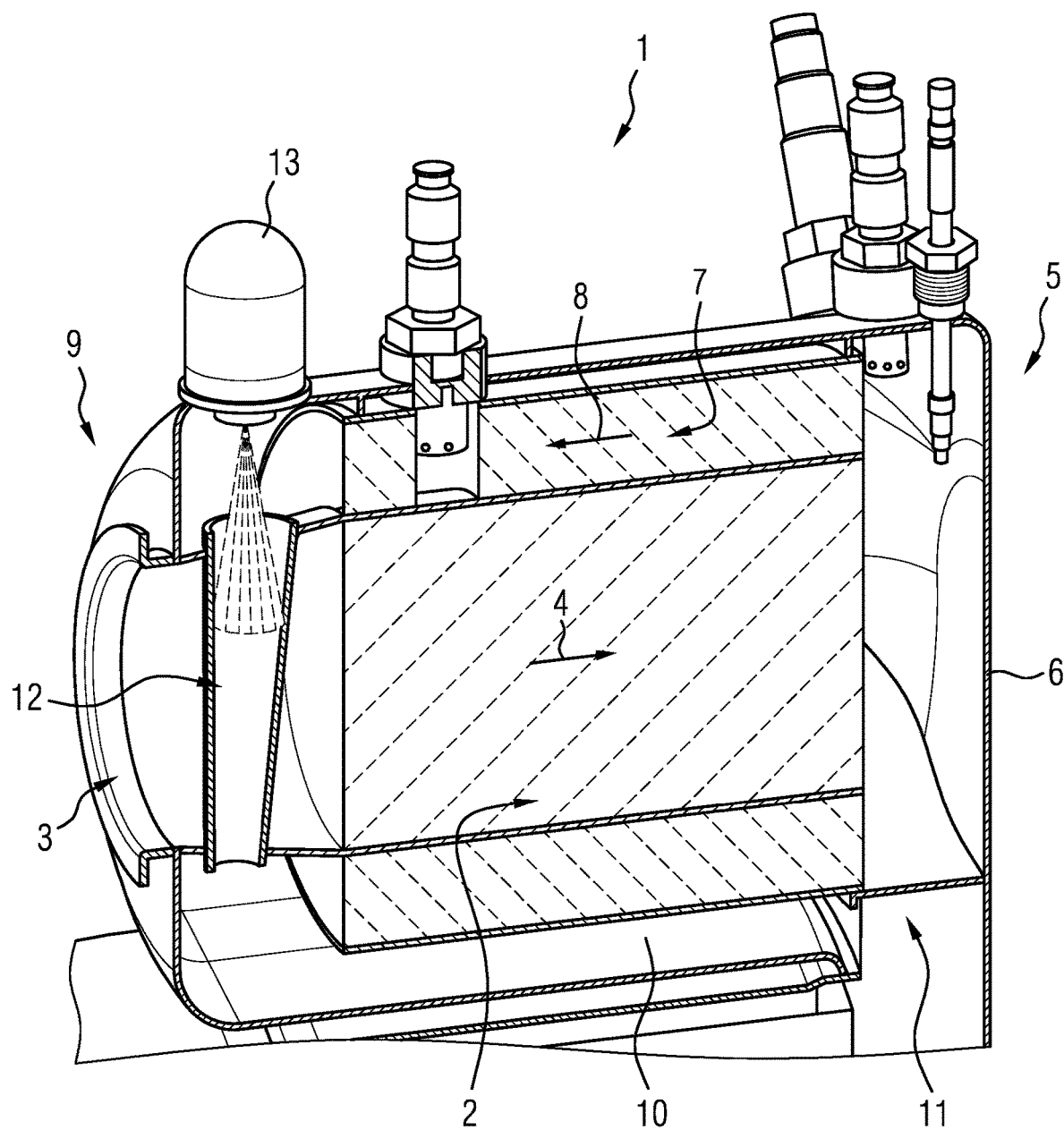
FIG. 1 is a sectional view through an annular catalytic converter according to the invention, wherein the centrally extending tubular first flow path is shown, which is surrounded by an annular second flow path, wherein a pipe is led from the outside through the second and the first flow path, into which pipe the aqueous urea solution is metered.

FIG. 1 shows an annular catalytic converter 1. The annular catalytic converter 1 has a first tubular flow path 2, to which exhaust gas is admitted through an inflow point 3. The exhaust gas may flow along the tubular first flow path 2 in an axial direction 4 and, at the axial end region 5 situated opposite the inflow point 3, is diverted by the housing 6 through 180 degrees and flows over into the annular second flow path 7. In the annular second flow path 7, the exhaust gas flows, counter to the axial direction 4, along the axial direction 8 toward the axial end region 9, which has the inflow point 3. At this axial end region 9, the exhaust gas may flow out along a radial direction into a channel 10 which extends at least partially parallel to the flow paths 2, 7. Via this channel 10, the exhaust gas is supplied to further exhaust-gas aftertreatment components.

In the exemplary embodiment of FIG. 1, the channel 10 has, at the axial end region 5, an outflow point 11 which allows the exhaust gas to flow out of the annular catalytic converter 1 in a radial direction. The point at which the exhaust gas passes over from the second flow path 7 into the channel 10 may also be referred to as outflow point.

Furthermore, FIG. 1 shows a pipe 12 which extends through the housing wall which delimits the second annular flow path 7 to the outside, which pipe is led in the radial direction through the second flow path 7 and the first flow path 2 and opens into the lower region of the second flow path 7, which is adjacent to the radial passage into the channel 10.

On the outside of the annular catalytic converter 1, there is arranged a metering module 13 which is used for metering the aqueous urea solution into the pipe 12. The injector of the metering module 13 projects into the pipe 12 in such a way that the aqueous urea solution is metered into the pipe 12 in the radial direction of the annular catalytic converter 1 and in the axial direction of the pipe 12.

The pipe 12 is flowed around in the axial direction 4 by the exhaust gas which flows through the inflow point 3 into the annular catalytic converter 1. Here, heating of the pipe 12 occurs by virtue of heat energy being transferred from the flowing exhaust gas to the wall of the pipe 12. As a result of the transfer of the heat from the exhaust gas to the pipe 12 and thus to the aqueous urea solution that is metered into the pipe 12, the thermolysis and the hydrolysis are promoted, whereby evaporation of the aqueous urea solution occurs, in the case of which gaseous ammonia and carbon dioxide are formed. The ammonia subsequently reacts with the nitrogen oxides in the exhaust gas to form nitrogen and water.

The pipe 12 thus serves as an evaporation path for the aqueous urea solution. By means of the advantageous arrangement of the pipe 12 at the inlet side of the annular catalytic converter 1, the exhaust gas impinges at a high temperature on the pipe 12, resulting in particularly rapid heating of the pipe 12 and thus in rapid evaporation of the aqueous urea solution. In particular, the arrangement of the annular catalytic converter 1 in the direct vicinity of the internal combustion engine, for example downstream of the exhaust-gas turbocharger, contributes to the fact that the exhaust gas does not undergo intense cooling before entering the annular catalytic converter 1 and impinging on the pipe 12. It is thereby achieved that the time until the activation of the metered addition of the aqueous urea solution, which is started only after a minimum temperature has been attained, is as short as possible. This leads to a faster complete exhaust-gas aftertreatment and thus, in particular also during cold starting, to a faster reduction of the emissions in the exhaust gas.

In the exemplary embodiment of FIG. 1, the pipe 12 is led all the way through the first flow path 2, such that the urea solution cannot pass over into the first flow path 2. The pipe 12 opens into the second flow path 7, so that the urea solution flows over here into the exhaust-gas flow and is entrained with the exhaust-gas flow. The reaction between the generated ammonia and the nitrogen oxides in the exhaust gas is therefore downstream of the pipe 12 and substantially in the channel 10.

In alternative embodiments, the pipe may also open into the first flow path or at least have a first outlet into this flow path. This would allow the urea solution to flow out into the exhaust-gas flow in the first flow path. It would also be possible to provide an opening in the region of the metering point, which opening permits the inflow of exhaust gas from the second flow path into the pipe. This would accelerate the mixing of the urea solution with the exhaust gas and increase the discharge rate of the urea solution into the exhaust-gas flow.

In FIG. 1, the pipe 12 is shown as a pipe 12 which tapers conically from the metering point and which has smooth walls. In alternative embodiments, the cross section of the pipe may also be designed differently. Also, the walls of the pipe may have structures for surface enlargement and/or coatings. It is also possible for the pipe, which in FIG. 1 runs so as to be deflected slightly out of the vertical, to be oriented differently. Here, it is particularly advantageous if the pipe is oriented toward the outflow point of the annular catalytic converter in order to transfer the evaporated urea solution into the exhaust-gas flow in such a way that the evaporated urea solution is entrained as far as possible without residues and is distributed in the exhaust-gas flow as effectively as possible.

Figure 2:
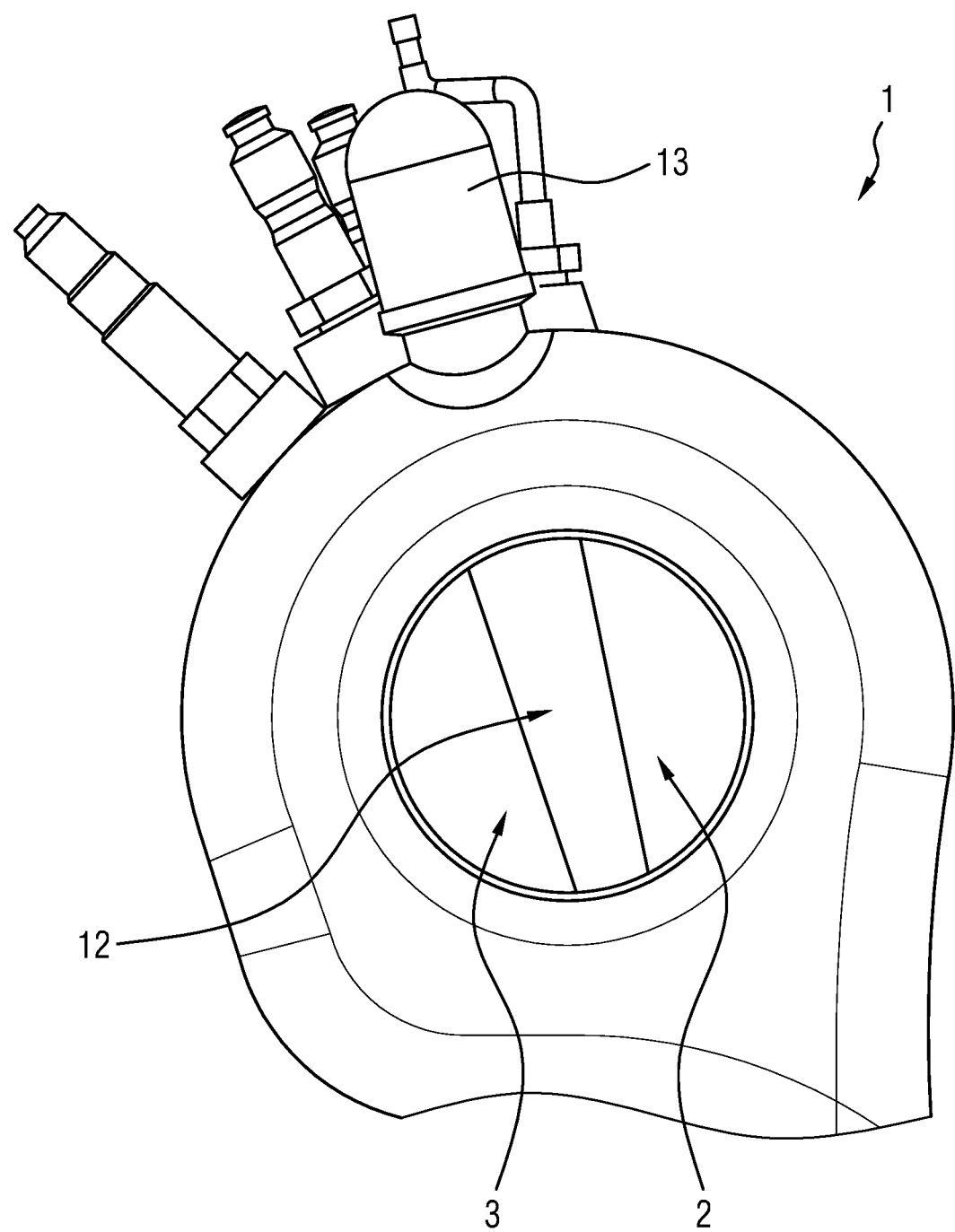
FIG. 2 is a side view of the annular catalytic converter from FIG. 1, wherein the view is directed to the inflow point at the first flow path, and it is possible to particularly clearly see the pipe which is led from the outside through the outer wall of the annular second flow path into the annular catalytic converter and which extends through the tubular first flow path in the radial direction.

FIG. 2 shows a side view of the annular catalytic converter 1. It is seen in FIG. 2 that the pipe 12 extends in the interior of the annular catalytic converter 1 so as to be inclined with respect to the vertical, so that the mouth of the pipe 2 is oriented in the direction of the flow transfer point from the second flow path 7 into the channel 10.

In the view of FIG. 2, which corresponds to a view of the annular catalytic converter along the flow direction 4 in the first flow path 2, it is clearly seen how the pipe 12 crosses the first flow path 2 and extends in front of the inflow point 3 such that the pipe 12 is flowed around by the inflowing exhaust gas.

Various honeycomb bodies, filters or other devices for exhaust-gas aftertreatment may be arranged in the flow paths within the annular catalytic converter 1.

The exemplary embodiment shown in FIGS. 1 and 2 is in particular not of a limiting nature and serves for illustrating the concept of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An exhaust system for the aftertreatment of exhaust gases, comprising:
    an annular catalytic converter which is flowed through by exhaust gas;
    an inflow point being part of the annular catalytic converter;
    an outflow point being part of the annular catalytic converter;
    a tubular first flow path being part of the annular catalytic converter;
    an annular second flow path being part of the annular catalytic converter, the tubular first flow path and the annular second flow path are oriented concentrically with respect to one another and which are flowed through in series; and
    a pipe led in the radial direction from the outside through the second flow path, the pipe opens into the annular catalytic converter and the pipe has a radial extent at least as far as into the inner first flow path;
    wherein the first flow path is surrounded to the outside in a radial direction by the second flow path, and the pipe is flowed around in the axial direction by the exhaust gas which flows through the inflow point.

2. The exhaust system of claim 1, wherein the exhaust gas, at a first axial end region of the annular catalytic converter, is caused to flow into the radially inner, first flow path through the inflow point and is caused to flow into the radially outer, second flow path by a flow diversion at the second axial end region, situated opposite the inflow point, of the annular catalytic converter, in which exhaust gas in the radially outer, second flow path is caused to flow back to the first axial end region counter to the flow direction in the radially inner, first flow path, and the exhaust gas, at the first axial end region, is caused to flow into a channel which leads to an outflow point.

3. The exhaust system of claim 1, wherein the aqueous urea solution is metered in a radial direction into the pipe.

4. The exhaust system of claim 1, the pipe further comprising a radial extent through the radially inner, first flow path into the radially outer, second flow path.

5. The exhaust system of claim 1, the pipe further comprising a conically tapering cross section.

6. The exhaust system of claim 1, wherein the pipe is arranged at the axial end region of the annular catalytic converter at which the exhaust gas is caused to flow into the annular catalytic converter through the inflow point.

7. The exhaust system of claim 1, the pipe further comprising surface-enlarging elements on its inner shell surface and on its outer shell surface.

8. The exhaust system of claim 1, the pipe further comprising surface-enlarging elements on its inner shell surface.

9. The exhaust system of claim 1, the pipe further comprising surface-enlarging elements on its outer shell surface.

10. The exhaust system of claim 1, wherein the pipe is of structured form and is coated on its inner shell surface and on its outer shell surface.

11. The exhaust system of claim 1, wherein the pipe is of structured form.

12. The exhaust system of claim 11, wherein the pipe is coated on its inner shell surface.

13. The exhaust system of claim 11, wherein the pipe is coated on its outer shell surface.

14. The exhaust system of claim 1, wherein the pipe is coated on its inner shell surface and on its outer shell surface.

15. The exhaust system of claim 1, the pipe further comprising a third flow path, and the exhaust gas in the first flow path and in the second flow path flows around the pipe.

16. The exhaust system of claim 1, further comprising a hydrolysis catalytic converter integrated into the pipe.

* * * * *